May 4, 1943.  C. R. DOTY  2,318,299
INTERCONTROLLED TYPEWRITER-PUNCHING MACHINE
Filed Dec. 23, 1941  7 Sheets-Sheet 1
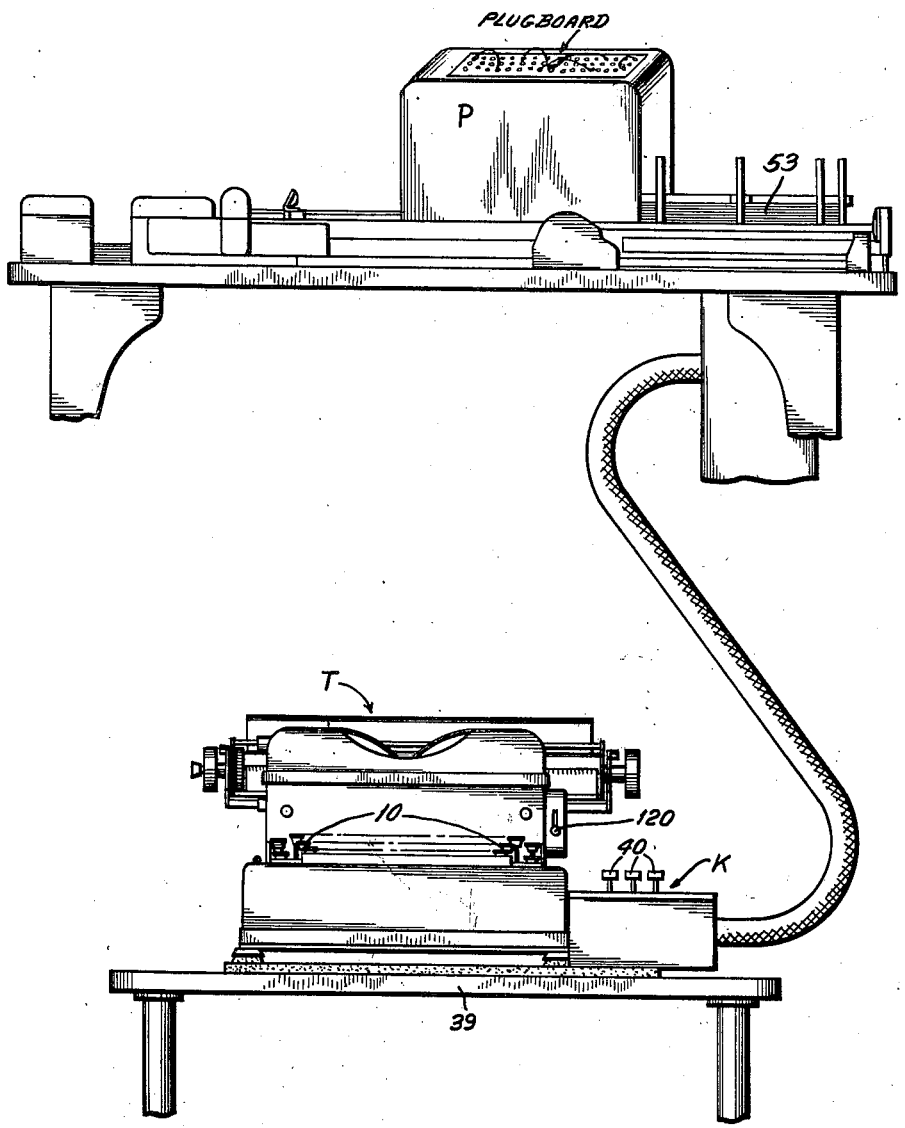

May 4, 1943.  C. R. DOTY  2,318,299
INTERCONTROLLED TYPEWRITER-PUNCHING MACHINE
Filed Dec. 23, 1941  7 Sheets-Sheet 2
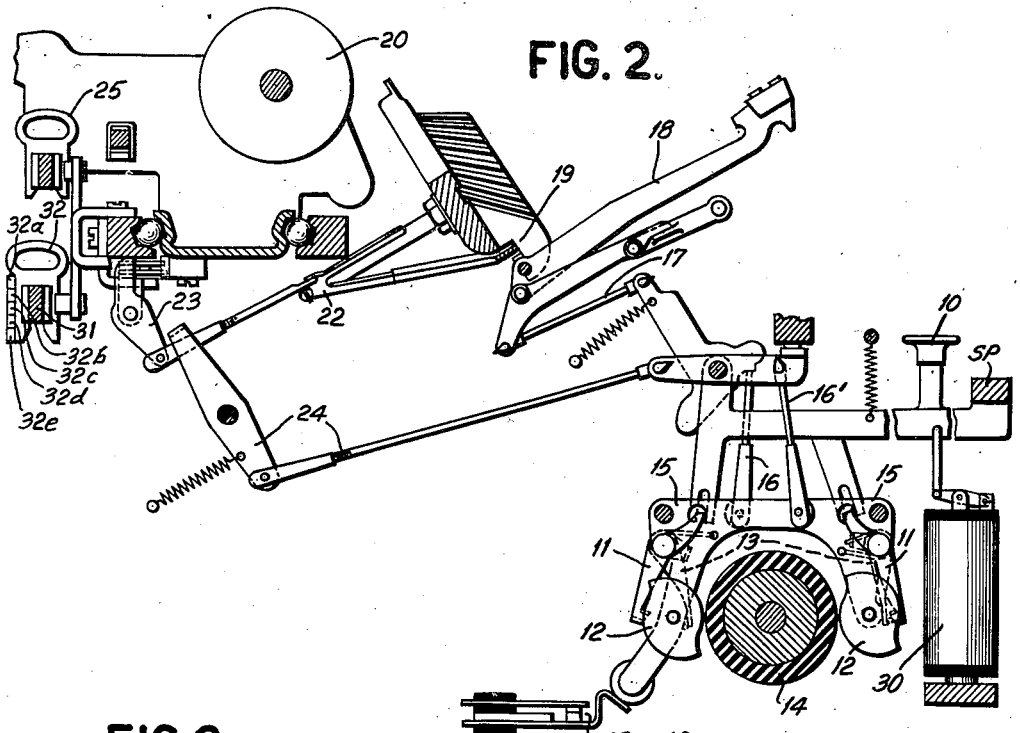
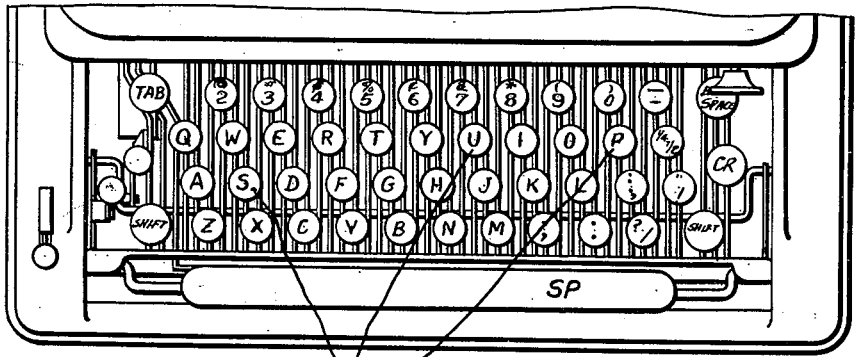
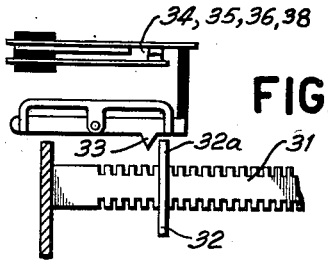
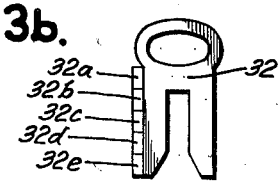
INVENTOR
Charles R. Doty
BY
ATTORNEY May 4, 1943.  C. R. DOTY  2,318,299
INTERCONTROLLED TYPEWRITER-PUNCHING MACHINE
Filed Dec. 23, 1941   7 Sheets-Sheet 3

INVENTOR
Charles R. Doty
BY
W. M. Wilson
ATTORNEY

May 4, 1943. C. R. DOTY 2,318,299
INTERCONTROLLED TYPEWRITER-PUNCHING MACHINE
Filed Dec. 23, 1941 7 Sheets-Sheet 4

INVENTOR
Charles R. Doty
BY
W. M. Wilson
ATTORNEY

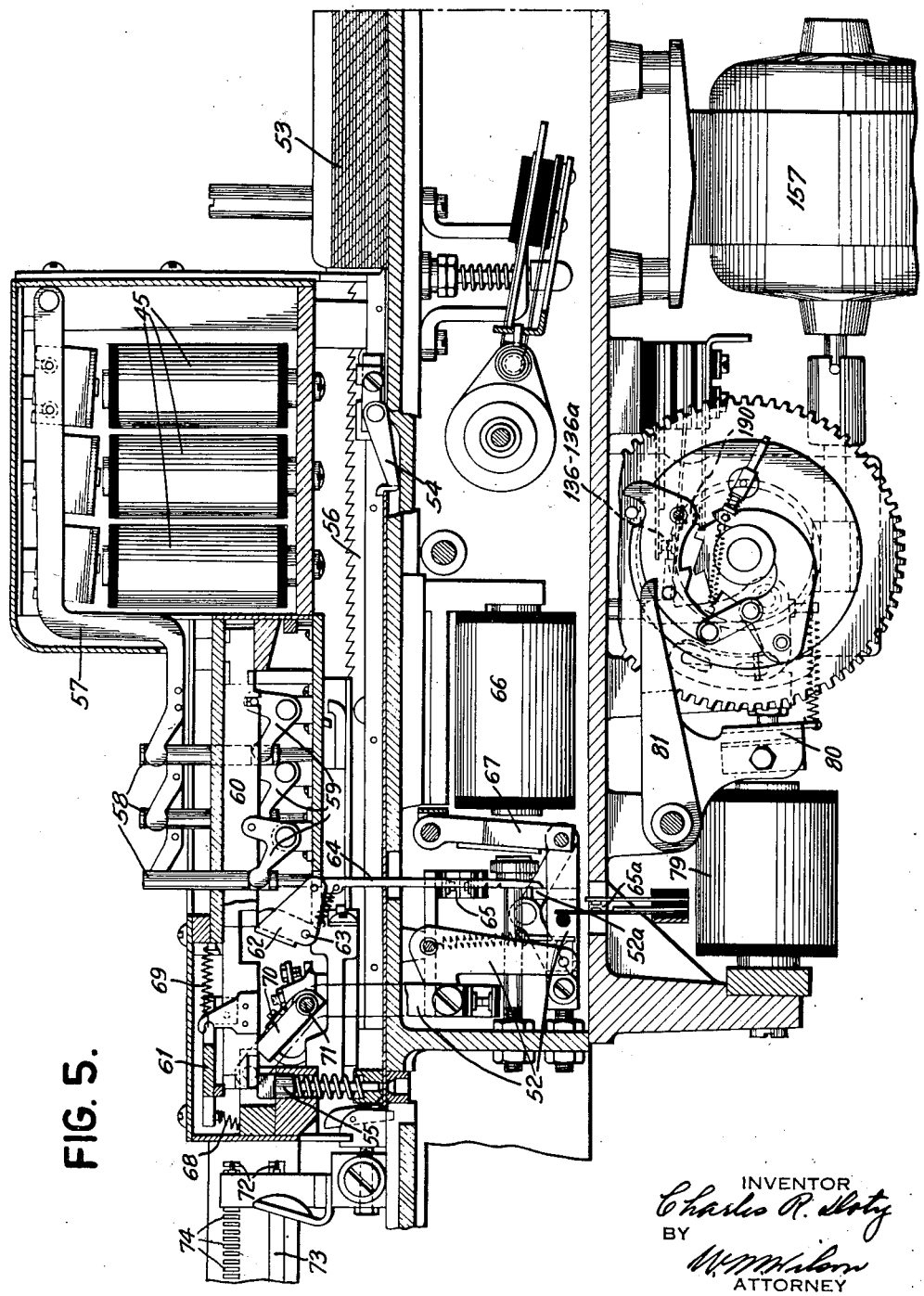

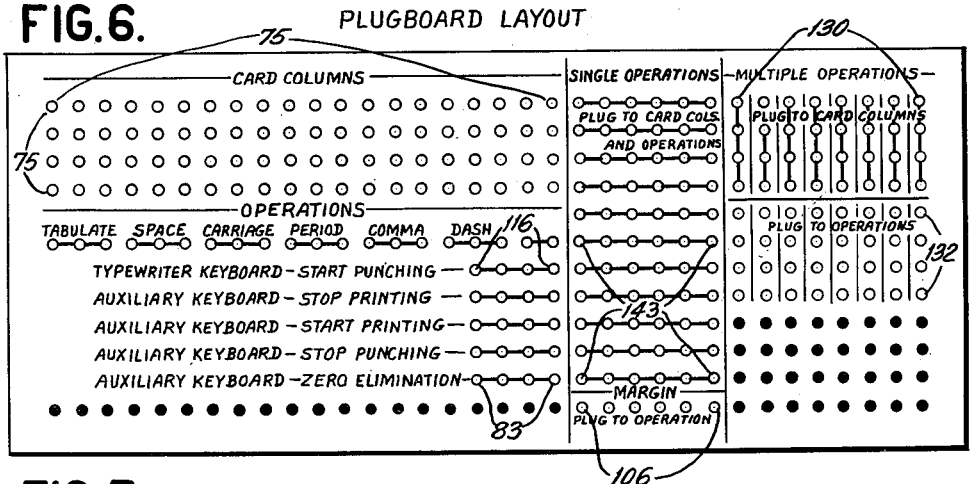

May 4, 1943. C. R. DOTY 2,318,299
INTERCONTROLLED TYPEWRITER-PUNCHING MACHINE
Filed Dec. 23, 1941 7 Sheets-Sheet 7

Patented May 4, 1943

2,318,299

UNITED STATES PATENT OFFICE 2,318,299

INTERCONTROLLED TYPEWRITER-PUNCHING MACHINE

Charles R. Doty, Yonkers, N. Y., assignor to International Business Machines Corporation, New York, N. Y., a corporation of New York Application December 23, 1941, Serial No. 424,178

46 Claims. (Cl. 164—113)

This invention relates to combined typewriter and punching machines, and it has for its main object the invention of an arrangement that will increase the speed of the operator and operating efficiency over arrangements which have heretofore been devised for the purpose of concomitantly typing data by a typewriter and punching certain information thereof upon a tabulating card. Machines of this type have previously been built and employed commercially but have not enjoyed wide commercial use for the principal reason that the arrangements utilized lacked the characteristics of speed and efficiency of the present machine and their inefficiency in operation prevented their use in many accounting installations.

The inefficiency of the prior arrangements was due principally to the fact that the operator, in addition to the depression of keys for the recording operations, was required to make additional setups interspersed with key depressions in order to synchronize the typing and punching units.

The operator efficiency in the present arrangement has been increased by eliminating the necessity for setting devices after the preliminary setup for selectively controlling punching and typing and enables certain operations to be effected in the typewriter automatically and without attention of the operator.

The operating efficiency likewise has been increased by adopting in the arrangement disclosed a power operated typewriter which enables simultaneous punching and typing from a keyboard apart from the digit and alphabetical keyboard of the typewriter or the keyboard of the punching machine and herein known as the "auxiliary keyboard."

The form of punching machine preferably employed herein is of the electromagnetically controlled type wherein punching operations are effected by energization of punch selector magnets. The form of machine just referred to will be recognized from the following description of the arrangement and it will be recognized that this punching machine includes mechanisms which are automatically operated without the attention of the operator such as skipping of card fields, automatic punching duplicating operations, card ejection, etc. The incorporation of such automatically operated devices has accorded increased efficiency of this type of punching machine, and correspondingly, in the combined typewriter and punching machine, certain mechanisms therein are automatically operated without the attention of the operator and are effected as concomitant typing and punching operations ensue. In more detail, such automatically operated mechanisms consist of the automatic operation of the punctuation typing keys, such as the period, comma, short dash or hyphen, oblique line, and in addition, the automatic operation of certain other keys of the typewriter which may be designated as functional keys, such as carriage return, tabulate and space. As will be more evident later on, the operating controls for such mechanisms are initiated into operation under control of the punching machine consisting preferably of the card carriage which carries the tabulating card which is being punched. It is recognized, therefore, that upon the completion of typing in certain columns of the matter printed which may be a bill or invoice, the operator will understand that the punching and typing operations are in correspondence when one of the above functions in the typewriter is automatically effected upon the completion of typing data in a certain column position. In prior forms of machines, the operator viewed the typed result and assumed that the punching and typing units were in synchronism. That is, the typing was effected upon a predetermined column of the bill and the corresponding digit punching was effected upon the related column of the tabulating card. This, however, due to the prior structures, was not necessarily the fact because if the punching machine failed to punch in one column or did not move to the proper column position, the punching and typing units would appear to be in synchronism where, in fact, they were not. This requirement, which has been the principal reason for failure to secure wide application in commercial use of prior machines, has been attained in the present arrangement by causing the initiation of certain mechanisms in the typewriter to be effected automatically under control of the carriage of the punching machine. For example, if a certain column of typing was reached and one of the mechanisms in the typewriter should be automatically operated at this point but was not, due to the failure of the punching machine to reach a corresponding digit punching position, this would be a clear indication to the operator of a discrepancy and the reason therefor would be examined and corrected. In typing an invoice or a bill of a conventional form, it is apparent that certain of the functions, such as tabulation of the typewriter carriage, spacing of the carriage, carriage return, and the special character printing, occur many times during the recording operations and upon an occurrence of each of such operations at the required time, it will be an indication to the operator that the proper synchronism relationship is maintained.

In previous conceptions of combination typewriter and punching machines, the digit keyboard of the typewriter usually constituted the primary or operating control means. That is to say, the depression of such keys caused the concomitant operation of the punch selectors of the punching machine, and therefore, the operator was not only required to effect the operation of the type bar striking mechanism but caused the operation of suitable control devices for effecting the digit punching operations. As previously indicated, the present arrangement includes a power operated typewriter, the key levers of which are electromagnetically controlled similarly to the electromagnetic control for the punching machine and the use of such form of controlling instrumentalities lends itself to control as to digit keys and space, release, car., ret., tab., X and R keys by a common or auxiliary keyboard which is apart from the type writer or puncing machine keyboards. The keys of this keyboard merely close contacts which control the electromagnetic instrumentalities of the punching machine and the typewriter and in view of the fact that it is only necessary to close electric contacts for such control, the keyborad strokes can be provided as light as possible and therefore the speed of key strokes is very much greater than that which can be secured by using the typewriter digit keyboard of the prior arrangements. The above arrangement is a principal object of the invention and in addition thereto for simplification in operation and control, it is desirable that the auxiliary keyboard also includes supplemental keys other than the digit control keys which enable certain functions to be performed in the typewriter as well as the punching machine, without having recourse to the corresponding keys in either the puncing machine or typewriter. With all of the controls before the operator in a simple keyboard design, it is obvious that the desirable high speed of operations is attained, increasing operator efficiency.

Where punching machines and typewriters are coordinated for concurrent operation, in most instances of digit recording it is desirable to punch on the tabulating card the data which is typed upon an invoice or bill, but certain operations require that digit punching operations be eliminated while digit typing for the bill takes place, and conversely, it is not desirable at times to type certain data while punching is actually effected upon the tabulating card. In prior structures, this has been attained by providing a control solely from the typewriter carriage for controlling the punching operations or else by a manual switch which is manipulated by the operator as the different requirements come up. Either of these forms of control are objectionable and either decreases operator efficiency or does not enable the wide flexibility which is desirable.

The above requirements art attained by providing a plugboard arrangement to which are connected all the controls which are required to alter the normal typing and punching conditions in accordance with the requirements. The cutout of the punching operations is preferably initiated in one machine and restored by the other. Preferably, the elimination of punching operations while typing takes place, is effected by the carriage of the punching machine while the resumption of punching is initiated by the typewriter carriage. The column position at which such controls are to be effected can be varied by plug wire connections on the plugboard or selectively placed instrumentalities on the typewriter carriage.

In a similar manner, the start and stop of typing, while punching operations take place, are intercontrolled solely by the punch carriage of the punching machine, the flexible plugboard determining the column position at which typing should be started and stopped.

The above mentioned plugboard has also connected thereto the electromagnetic controls for tabulating the typewriter carriage, effecting the automatic return of the typewriter carriage, the operation of the spacing mechanism, as well as the special punctuation character typing on the typewriter and by suitable plugging connections these controls may be initiated at certain column positions of the typewriter or punching machine.

A subordinate, but relatively important object of the present invention, is the provision of an arrangement for suppressing the typing of zeros, nevertheless permitting the punching of zeros on the tabulating card. It is the requirement that for a field of the tabulating card, all of the columns be punched and those columns which do not contain digit recording 1 to 9 are, nevertheless, punched to represent zeros. It is evident that the 0 recording should not take place upon the invoice or bill since the zeros to the left are meaningless and confuse the interpretation of the amount typed. The zero suppression mechanism incorporated therein has for an intermediate field of data its control initiated by the carriage of the punching machine and while it enables the punching of zeros, it suppresses the operation of the zero typing key lever and instead of such zero typing operations, the spacing mechanism of the typewriter carriage operates. The zero suppression pertains, particularly to the recording of monetary amounts which, in the English monetary system, consists of recording dollars and cents and the present arrangement provides for automatic printing of the comma and period while typing upon the invoice or bill. These controls, likewise, are brought to the plugboard and their operation is automatically effected at the desired column positions of the typewriter.

As will be evident later on, the zero suppression mechanism may be set considerably in advance of the field in which it is to be utilized and in the normal operation of the machine the operation of certain key levers of the typewriter would break down this zero suppression setup and means are provided to retain this setup until the zero suppression mechanism actually comes into use later on in the field in which it is to be utilized.

Summarizing, the following automatic operations are effected in the present machine with particular relation to the intercontrol of the typewriter and punching unit.

1. Start and stop typing while punching.
2. Start and stop punching while typing.

With regard to special character recording operations, the following automatic operations can be effected:

1. Eliminate zeros to the left on the printed form.
2. Print special characters such as period, comma, dash and oblique line.

With regard to the automatic controls for the typewriter, the following automatic functional operations can be effected:
1. Tabulate the typewriter carriage.
2. Automatic return of the typewriter carriage.
3. Automatic operation of the space mechanism for the typewriter carriage.

As premised hereinbefore, the auxiliary keyboard is provided with ten digit controlling keys which suffice for effecting the concomitant digit typing and digit punching but there are occasions when it is desirable to effect alphabetic recording upon the bill, for example, in writing a description of the articles sold or inserting the name and address of the person to whom the bill is addressed. In the present arrangement, while the punching machine and typewriter unit are interconnected for control by the auxiliary keyboard, the operator may have recourse to the alphabetic character keyboard of the typewriter since the latter is in front of the operator and when desired, such alphabetic typing may be effected with or without punching operations on the tabulating card.

It is well known that alphabetic recording can be represented on a tabulating card by means of combinational holes punched in the card columns thereof. The typewriter illustrated herein has provision for such form of punching. Where the tabulating card should be punched to represent the alphabetical information, it can be initiated into operation at the desired column position by a suitable plug connection and stopped when a certain column position of the typewriter carriage is reached, and preferably by control mounted on the typewriter carriage itself.

Summarizing, the present arrangement provides for a wide variety of numerical and alphabetical typing upon the invoice as well as corresponding punching recording upon the tabulating card, either of the recordings being brought into operation at will of the operator by a plugboard arrangement which provides for greater selectivity and flexibility than has been attained heretofore.

It is emphasized that the automatic operations previously described can also be performed in multiple from any card carriage position of the punching machine, and preferably, through a plugboard connection to the plug socket of the desired card column position a relay is energized, the multiple contacts thereof providing for the operation of the desired controls.

The aforementioned electrical controls through plugboard connections permits the utmost in flexibility and enables the units to be readily adapted to any tabulating card or report form requirements.

In the above description, it is assumed that the punching machine and typewriter have been interconnected so as to perform the recording operations for a bill and tabulating card according to the desired requirement but the present invention has, for its object, the provision of a selective control which will enable the use of the typewriter or punching machine as an independently controlled unit. This selective control is adapted to have three different positions of adjustment and in the normal or intermediate position of adjustment, the punching machine and typewriter are interconnected. In another position of the selective control, the punching machine is completely disconnected for control by the auxiliary keyboard or the alphabetic keyboard of the typewriter and typing may be effected upon a bill or invoice or other sheets by the manipulation of the alphabetic keyboard of the typewriter, or the auxiliary keyboard when typing of digits is to be performed. In still another position of the selective control, the typewriter alphabetic keyboard is connected with the punching machine so that the operation of the punching machine and typewriter may be concurrently effected by the alphabetic keyboard or the auxiliary keyboard may be used for punching digits only without operating the typewriter, in this same control position.

The above outlines the principal features, advantages, and benefits of the novel combination and in presenting these features, only the most important and outstanding features are referred to but as the description of the invention is understood, further features, but relatively important ones, will be recognized as their description is comprehended. In general, it will be observed that the present novel arrangement provides for not only wide flexibility in intercontrols but are so designed that operator and operating efficiency are increased to the point where a greater amount of recording work can be obtained than that possible heretofore. In addition to the interconnection, it is evident that the machines may be used independently as the necessity for their sole use comes about.

It is to be further understood that the punching machine and typewriter shown herein are selected for purposes of illustration and the showing of a specific form of punching machine and typewriter should not be considered as restrictive since many of the features shown and claimed herein may be applied and used with other forms of typewriters and punching machines. It is evident, while a form of punching machine is shown which is of a well known type, nevertheless other forms of punching machines may be utilized in connection with the present invention without departing from the spirit thereof. Typing operations on the typewriter may be effected concomitantly with the setup of punch selectors without actually effecting card punching operations, if so desired. In some forms of punching machines, the punch selectors are merely set up as typing operations ensue and upon the complete setting up of the punch selectors, punching operations ensue in one cycle of operation thereof. It is evident that this form of punching machine may, with regard to its carriage, be provided with a control corresponding to the control secured by the card carriage of the punching machine of the illustrative embodiment. Adopting this form of control for the other form of punching machine, will enable the operator indication of the synchronism or lack of synchronism of the typewriter carriage relative to the card column being set up for punching by the punching selectors.

It is to be further understood that, while it is preferable to employ the auxiliary keyboard with the outstanding advantages and benefits thereof, either the typewriter or punching machine may have an integral numeric keyboard operable and connected for operation in the same manner as the auxiliary keyboard and the illustration of the auxiliary keyboard detached from the typewriter or punching machine as a preferred embodiment is not to be considered as restrictive of the present invention.

Other forms of modifications are readily evident and it is thought that such modifications need not be described herein.

Other objects of the invention will be pointed out in the following description and claims and illustrated in the accompanying drawings, which disclose, by way of example, the principle of the invention and the best mode, which has been contemplated, of applying that principle.

In said drawings:

Fig. 1 is a view in front elevation showing the interconnected typewriter and punching machine, the typewriter being shown mounted upon a table which is in front of the operator so that an auxiliary keyboard K mounted adjacent the typewriter may be operated to cause the concomitant operation of the typewriter T and punching machine P. The typewriter is within access of the operator when it is desired to manipulate the keys thereof to effect typing and punching operations by the typewriter keyboard.

Fig. 2 is a section view through the typewriter showing the type bar striking mechanism and the electromagnetic control of the keys for effecting the automatic operation of the type bar actuating mechanism. The section view also shows the platen and usual platen carriage of the typewriter having mounted on the carriage the customary typewriter carriage tabulating mechanism.

Fig. 3 is a plan view of the front portion of the typewriter showing particularly the keyboard arrangement.

Fig. 3a is a detail view of a tabulator stop control mechanism for operating certain contacts employed in the present invention.

Fig. 3b is a detail view of a complete series of tabulating stops utilized in the present invention showing the manner of arranging the operating projections so that the projections will selectively operate the contacts shown in Fig. 3a.

Fig. 5 is a longitudinal sectional view of a punching machine of a well known form and shows particularly the punch operating mechanism as well as the contact strip for effecting selective operations in the typewriter.

Fig. 6 is a diagram showing the layout of the plugboard utilized for selection of the electrical instrumentalities of the arrangement.

Fig. 7 illustrates a form of invoice which may be typed under control of both the typewriter and the auxiliary keyboard. Adjacent the representation of the invoice are legends indicating the selective operations which are performed as the invoice is typed.

Fig. 8 is a plan view of a tabulating card of a well known form and is shown perforated to represent some of the data which is typed upon the invoice. The legends also indicate certain operations which are carried out as the invoice is typed.

Fig. 9 is a view of the plugboard with the plug connections illustrated which are made for the problem assumed and to be hereinafter described.

The typewriter

Figure 4A:
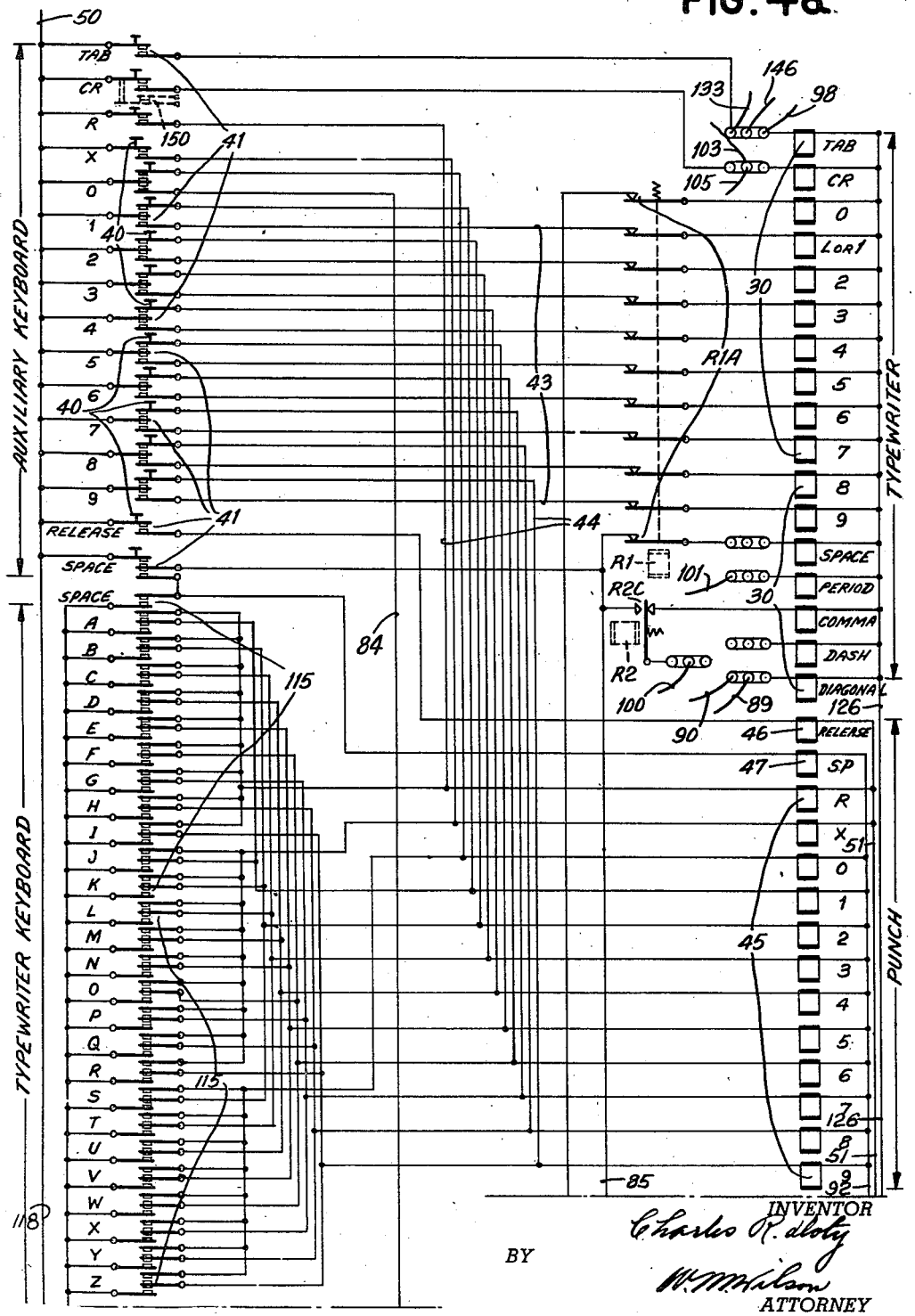
Figs. 4a and 4b represent a composite wiring diagram of the electrical instrumentalities of the machine and should be assembled with Fig. 4a on the top.

The invention is preferably shown in connection with a typewriter constructed as shown in Patents 1,777,055 and 1,873,512, which is now on the market and known commercially as the "Electromatic."

Fig. 3 shows the keyboard of which keys 10 are the alphabetic keys, and other functional keys are also shown, such as, CR for carriage return, TAB, the tabulating key, bar SP the space bar, special type or punctuation keys for printing a period, dash, comma, diagonal, these being principally used in connection with the present invention.

Briefly, referring to Fig. 2 depression of any of the typing keys releases a latch 11 from a cam 12, permitting a spring pressed lever 13 to move the cam 12 against the periphery of a continuously rotating motor driven roller 14. The cam 12 is rotated by contact with the roller 14 causing the carrier 15 of the cam to rock in a direction for depressing a link 16 which, through linkage 17, propels the type bar 18, carried by the basket 19, towards the platen 20 to effect typing from the type denoted by the operated key. During the final increment of the movement of the type bar 18, it strikes a universal bar 22 to actuate the escapement lever 23 for releasing the escapement mechanism to effect a carriage spacing movement. This is the operation which is effected for the typing keys.

Depression of space bar SP similarly results in downward movement of link 16' to operate linkage 24 for actuating the escapement lever 23 to effect a carriage or letter spacing movement.

The carriage return mechanism operated by key CR is of the type disclosed in Patent 1,955,614. As is usual, the carriage return movement is accompanied by a line spacing operation.

The tabulating mechanism operated by the key TAB is such as shown in Patent 1,935,436, and includes the usual settable tabular stops 25.

Supplementing the above construction and peculiar to the present invention are solenoids 30, one for the various keys to be operated under control of another keyboard or other instrumentalities. Energization of the solenoid 30 results in automatic operation of a key and the mechanism operated by the key whether it is a functional operation in the typewriter, or a typing operation from selected type. Referring to Fig. 4a there will be seen a series of the solenoids 30 and the designation affixed to each solenoid designates the particular key which is operated upon its energization. In general, for the present invention, the functional keys, Space, TAB, CR, and the type keys, 0–9, period, comma, dash, and diagonal are operated this way.

Also peculiar to the present invention, mounted on the slotted rack 31 (Figs. 2 and 3a) which is carried by the carriage of the typewriter, are marginal tabulating stops 32 which are fixed at desired positions on the rack corresponding to positions in which certain functions should take place when the carriage reaches such column positions.

The stops 32 are of different shapes and the five used in the present invention have projections 32a, 32b, 32c, 32d, 32e, at different heights as is evident in Fig. 3b. These projections contact and operate related levers 33 (Fig. 3a) at certain column positions of the carriage. For the five tab stops 32 there are related contacts 34, 35, 36, 37, 38 and contacts 34, 35, 36, 38, are opened by the related tab stops 32, as shown in Fig. 3a but contacts 37 (Fig. 4b) are closed by the related lever 33 by an obvious modification.

The typewriter T (Fig. 1) is shown mounted on a table 39 and adjacent the typewriter is a keyboard K, some keys 40 of which are operated to type on an invoice 26 (Fig. 7) in the typewriter and to punch at the same time a card 27 (Fig. 8) by means of a distantly located punch P (Fig. 1).

The auxiliary keyboard

The keyboard K known herein as the auxiliary keyboard may be of any conventional type consisting of exteriorly operated keys 40 to close contacts 41 (Fig. 4a). The keyboard consists of ten digit keys 0–9 inclusive, and special keys TAB, CR, which energize the solenoids 30 for these keys of the typewriter. Also included in the auxiliary keyboard are keys X and R for causing punching at X and R positions on the card, and keys, Release and Space which effect certain functions in the punching machine, the Space key also causing carriage spacing operations in the typewriter.

From Fig. 4a it will be seen that when the lower contacts 41 are closed by the digit keys 1–9, circuits are closed to the similarly designated solenoids 30 by lines 43 provided relay contacts R1A are closed. The relay magnet R1 is normally deenergized so as to concomitantly punch and type under control of the auxiliary keyboard, and is energized when it is desired to punch but not type.

The upper contacts 41 of the keys 1–9 and contacts 41 of X and R keys are connected to lines 44 which in turn are connected to the punch magnets 45 having similar designations.

Current for energizing the solenoids 30 or the punch magnets 45 and other relays is afforded by the lines 50, 51 which may be connected to a suitable source supply. It will be seen that the common line connection for solenoids 30 is connected by a line 126 to normally closed contacts 125 which are connected to the line side 51.

The closure of the contact 41 of the Release key effects the energization of the release magnet 46 in the punch, and the Space key effects the energization of the space solenoid 30 of the typewriter as well as the space solenoid 47 of the punching machine. Hence, by the depression of these keys in the auxiliary keyboard, spacing functions may be performed in the typewriter and/or punch and a release function in the punch without requiring the operator to depress the corresponding keys in the typewriter or punch.

The circuits controlled by the 0 key 40 which closes both its upper and lower contacts 41 will be subsequently explained.

Card punching machine

The card punching machine used in connection with the present invention is of the type shown in the patent to Fred Lee and George Daly 1,976,618, dated October 9, 1934, and only so much of the operation thereof will be explained as is necessary for an understanding of its operation in connection with the present invention.

Figure 4B:
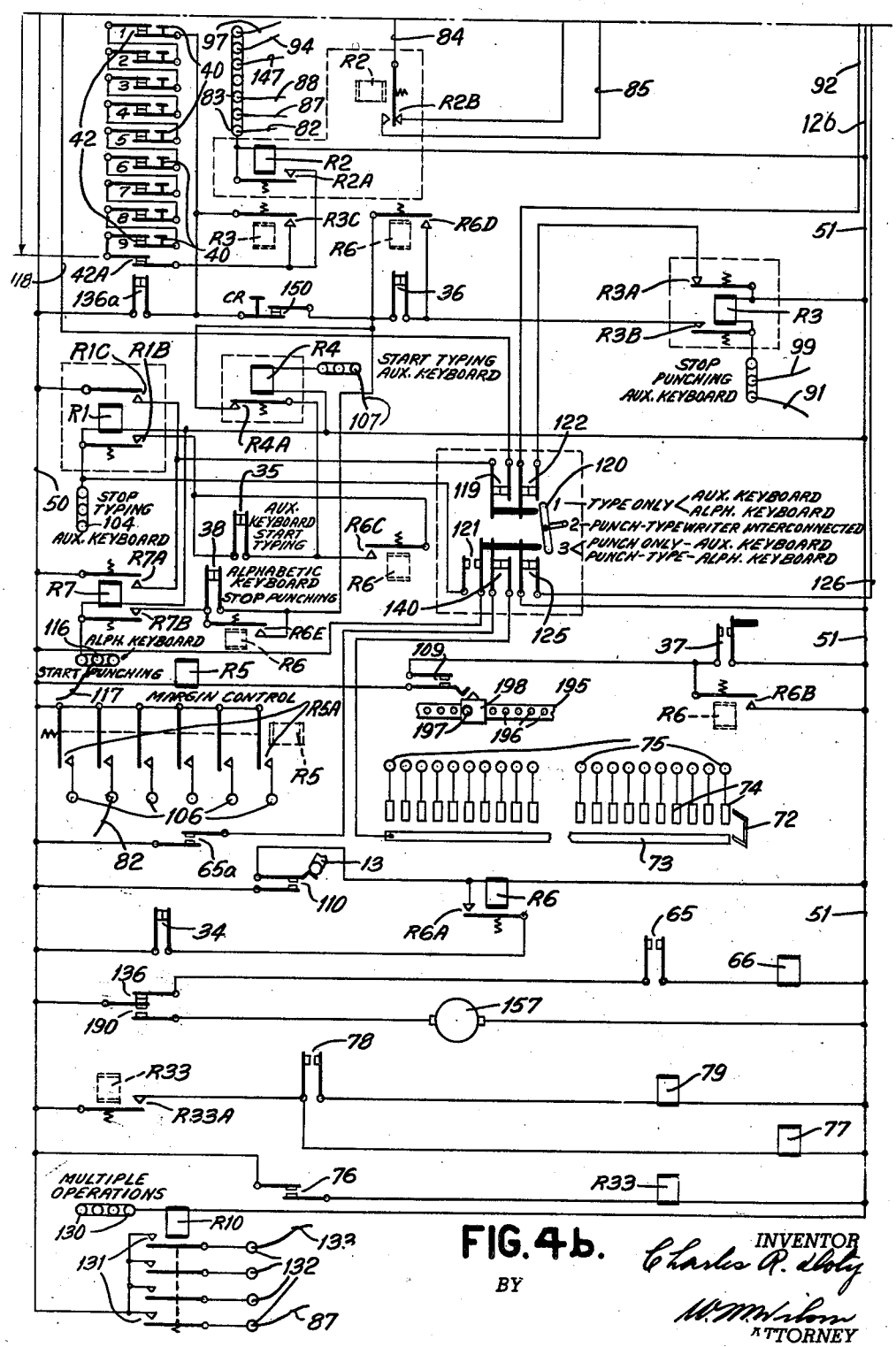

In general, the punching machine contains a feed magazine 53 (Fig. 5) from which the cards are fed singly from the bottom of the magazine as is well known by a picker which feeds the cards to a position under the punches 55 and in the present machine, the carriage escapes in the usual manner to present the twenty-first column of the card to the punches preparatory to receiving the perforations effected by the first manual punching operation. From this position, the card is engaged at its rear edge by a pusher 54 mounted upon an escapement rack 56 which, for each operation of the punches, permits the advance of the card step by step. The series of magnets 45 is adapted to select the punches 55 for actuation in the following manner: Associated with each magnet 55 is a pivoted armature 57 whose free end is connected to a rod 58 which, through a bell crank 59, moves an interposer bar 60 to the left in Fig. 5 where it cooperates with a punch bar or plate 61. The forward movement of the interposer bar 60 is adapted to rock a bail 62 pivoted on a rod 63 and which bail is connected to a spring pressed depending link 64 whose lower free end is adapted to engage and close contacts 65. This, as shown in Fig. 4b, closes a circuit from the line 50 through contacts 136 now closed, through contacts 65, through the magnet 66 to the line 51. The energization of the magnet 66 will then attract its armature 67 and through a link and bell crank connection 52 shown in the aforementioned patent will draw downwardly on the pivoted punch bar or plate 61 to force the selected interposer against the associated punch, thus perforating the card. When the armature 67 is attracted by magnet 66, a depending projection of the horizontal link 52 closes contacts 65a and such closure is effected after perforating the card and before the punch carriage spaces to the next column position. Contacts 65a are also shown in Fig. 4b.

The selection of the magnets 45 which are punch selectors for effecting the punching operations is under control of the series of keys 40 which close contacts 41 and as stated, such keys are mounted in an auxiliary keyboard separate from the punch.

As is fully shown in the patent to Lee et al. 1,976,618 when the armature 67 reaches the limit of its movement to the right, the link 64 will be moved by a projection 52a to become disengaged from one of the spring blades of contacts 65 to permit such contacts to open, thereby deenergizing the magnet 66 which will then release its armature allowing a spring 68 to rock the plate 61 upwardly and permit the selected interposer 60 to rise and thereafter be restored to normal position by a spring 69.

Escapement mechanism

The escapement mechanism is not shown herein since it is fully shown and described in the Patents 1,,976,618 and 1,426,223. It will suffice to say that when an interposer 60 is depressed it will rock a bail 70 attached to a shaft 71 and the rocking of this shaft will actuate the escapement mechanism to space the card carriage a single column.

Column selector

The column selector for the punching machine illustrated herein is also well known and is shown in the patent to G. F. Daly et al. 2,016,706, dated October 8, 1935. As shown in Fig. 1, as well as in Fig. 4b, it consists of a movable contact brush 72 carried by the punch carriage engageable with a reading strip comprising a common contact strip 73 and contact points 74, some of which are connected so as to cause certain functions to be performed when the carriage is at certain column positions, in a manner to be subsequently explained. Contact points 74 are individually connected to plug sockets 75 of a plugboard (see Figs. 4b and 6).

Incidental operations in punch

These operations consist of the closing of contacts 76 (Fig. 4b) which are closed in the last column position of the card carriage and which contacts are the same as contacts 191 in the Patent 1,976,618 and closed in the manner described in this patent. The closure of contacts 76 energizes a relay R33 to close contacts R33A, which in turn causes the energization of the card eject control magnet 77, which corresponds to magnet 199 of the aforementioned patent.

As the card is ejected, contacts 78, corresponding to contacts 201 of the aforementioned patent, will complete a circuit extending through relay contacts R33A to magnet 79, which corresponds to magnet 175 of the Lee et al. Patent 1,976,618.

Magnet 79 (Fig. 5) will attract its armature 80, and the arm 81 thereof will bear upon an insulating block to open contacts 136, 136a (both shown in Fig. 4b) and close contacts 190 precisely as in the last mentioned patent. Contacts 190 now being closed close a circuit to the motor 157 which is the same motor in the Patent 1,976,618, and similarly designated. At the same time, as is well known and explained in Patent 1,976,618, arm 81 effects the engagement of the clutch between this motor and the moving mechanism for the card carriage, which automatically feeds a blank card thereon for the next card punching operations, and returns the carriage to an initial starting position.

These incidental operations are only explained herein by reference to the wiring connections of the elements involved to effect these incidental operations. These operations, in the form of punching machine selected as an embodiment, are very well known and recourse to the patents referred to for such will give further details of construction and operation.

*Plugboard*

Included in the arrangement is a plugboard (Fig. 6) to which is wired the different electrical controls which alter the normal typing and punching operations. The plug sockets 75, marked "Card columns," are carried by this plugboard so that from various column positions of the punch carriage the controls may be selected for operations which are to be changed to accommodate various forms of cards and typewritten forms. The program of operations is plugged up before a job is started.

The particular purpose and function of this plugboard will be brought out more clearly as an exemplary punching and typing job is explained in detail. The plugboard is shown in Fig. 9 plugged for this job, and it is to be understood that many variations may be made according to the requirements, and the example shown is merely one of a great number of different jobs that may be performed.

The various controls are shown in the wiring diagram as magnets, or relays, and they terminate at the plug sockets which are under "Operations" as shown in Fig. 6.

The example selected is typing an invoice shown in Fig. 7 and punching a tabulating card with certain data, as is illustrated in Fig. 8.

*Mode of operation for selected example*

With the card carriage of the punch in the twenty-first column position to which it has previously skipped in the manner usual in punching machines of the type illustrated, the digit keys 40 of the auxiliary keyboard are depressed to punch the card to represent the invoice number —42401—. This is effected by closure of contacts 41 by the keys to energize the punch selecting magnets 45, and at the same time the solenoids 30 are energized to actuate the type of keys of the typewriter to also type —42401— on the invoice, as shown in Fig. 7.

However, the invoice number might have had zeros at the left which should be punched but not be typed. For this field which happens to be the first field to be punched and typed where zero typing elimination is to be performed, a plug connection is made, and in the example shown, a plug connection 82 (Fig. 9) is made from one of a series of "Zero elimination" plug sockets 83 to one of the "Margin" sockets 106. This plug connection is also shown in Fig. 4b and there will be subsequently explained in the section "Margin control circuit" the connection which is made at the other end of the plug connection 82. Suffice to say for the present when the punch carriage has been skipped to column 21 and when the typewriter carriage is at the initial starting position, a circuit will be closed which extends to the plug connection 82, to one of the plug sockets 83 (Fig. 4b), the circuit then extending through a relay R2, to line 51. R2 energizes to close its stick contacts R2A, the stick circuit being extended back to a series of serially connected and normally closed contacts 42 and 42A, through contacts 136a which are now closed but which are open at the same time as the previously referred to contacts 136. The purpose of the contacts 136a is to deenergize the relay R2 after punching the card has been completed and the punched card has been ejected and a blank card positioned on the carriage.

Relay R2 energizes and shifts its contacts R2B, and such shifting occurs before the first column of a field to be punched is punched. On depressing the zero key 40, the zero punch magnet 45 will be energized but when lower contacts 41 of the zero key 40 close, a circuit is extended by the line 84 through the contacts R2B now shifted, wire 85, through the related contact R1A now closed to the "Space" solenoid 30. This will effect the automatic operation of the space bar of the typewriter, and since the relay R2 is held energized each subsequent depression of the zero key 41 will cause automatic spacing of the typewriter carriage. Contacts 42 are additional contacts opened by the operating cams 12 (Fig. 2) for operating the 1–9 typewriter digit key levers, and contacts 42A are opened by the operating cam for the period key lever on the typewriter keyboard as shown in Fig. 2. Now, when the first digit of a number is punched, one of contacts 42 (Fig. 2) will be opened by the operating cam for the digit key lever 1–9 depressed, deenergizing relay R2 by opening its stick circuit, and the corresponding digit typewriter key will be concurrently operated. Typing of a period will also break down the zero elimination circuit by opening contacts 42A, the reason for this being more clearly explained later on.

Coincident with punching column 25 and after typing the last digit, there will be an automatic tabulating operation for the typewriter carriage, the carriage being tabulated under control of the tab stops 25, (Fig. 2) usual in the form of typewriter shown. From column 25 (Fig. 9) there is a plug connection 86 to a "multiple operations" relay plug socket 130 which relay is energized when column 25 has been punched.

When a plurality of functions are to be performed at one column position, it is desirable to employ a relay, such as R10 (Fig. 4b) to effect this, there being eight of such relays and each connected to the related series of plug sockets 130. When the relay is energized, it closes four pairs of contacts 131, one blade of the contacts being connected to four plug sockets 132 from which plug connections are made to plug sockets of the desired function. From one of these sockets 132 there is a plug connection 133 (Figs. 4b and 9) to a "Tabulate" plug socket (Figs. 4b and 9) to energize, as shown in Fig. 4a, the "Tab" solenoid 30. Contacts 65a (Fig. 5) close after perforating the card at column 25, or any other column, to energize this solenoid, thus initiating the typewriter carriage tabulating operation.

Also when punching column 25, by means of a plug connection 87 (Fig. 9) which is effected from one of the plug sockets 132 to one of the plug sockets 83, the zero elimination relay R2 will again be set up for the next field. When the zero typing elimination device or any other operation are to be used for card fields after the first card field, the plug connections are made from the card column positions which just precede the initial column position of the card field in which they are to be effected, and the other end of the plug connection is made to one of the plug sockets for the desired function. In the operation now being described, this form of plug connection is made, and accordingly, when column 25 is punched, which is the last column of the invoice number field, a circuit will be closed from the line 50 (Fig. 4b) through contacts 65a to contacts 140 now closed, to the common strip 73, the brush 72 at the column 25 position, the related plug socket 75, the plug connection 86 to plug socket 130 (Fig. 9), relay R10 (Fig. 4b), to line 51. The relay contact circuit extends from line 50, contacts 131, plug socket 132, plug connection 87 to one of the plug sockets 83 (Fig. 9), the circuit then extending through the relay R2 (Fig. 4b), to the line 51. As just indicated, contacts 65a which are also shown in Fig. 5, are closed after perforating the card. This enables the typing and punching operation to be performed for the last column of a card field but enables the energization of a control relay or solenoid prior to punching of the first column of the next card field.

After punching and typing the last digit of the invoice number (column 25) the typewriter carriage is tabulated, and this is a visual indication of synchronism at this point.

The number of month is next punched in columns 26 and 27 of the card and typed on the invoice at the position the typewriter carriage tabulates to, and coincident with punching column 27 and after the typing operation, by a plug connection 141 (Fig. 9), the second multiple operation relay R10 is energized to close its contacts and by a plug connection 88 the zero elimination control relay R2 is again set up for punching the number of the day which is also typed on the invoice. From the plug socket 132 of this second multiple operation relay, there is a plug connection 89 (Fig. 9) to the solenoid 30 for typing a diagonal. However, if a hyphen or short dash is to be typed a plug connection is made to the solenoid 30 for typing the dash.

Attention is also directed to the plug connection 90 (Fig. 9) from the plug socket 132 of the third multiple operation relay R10, energized when column 29 is reached which extends, as shown in Fig. 4a, to a plug socket connected to the solenoid 30 of the key which types a diagonal. (See also Fig. 8.) This will automatically print this sign after typing the number of the month and day without any attention on part of the operator.

After typing the day of the month, the operator depresses the keys of the auxiliary keyboard for the year, but only the digit keys of the typewriter are operated under control of the auxiliary keyboard to type the number of the year on the invoice. Punching of this number is unnecessary and at this point there is an automatic disconnection of the punch, effected by the punching machine itself, described as follows:

When column 29 is punched, a circuit is completed from contact point of column 29, plug connection 142 (Fig. 9) to the third relay of the R10 type and from its related plug sockets 132 there is a plug connection 91 to one of the "Stop punching" sockets (Figs. 4b and 9), relay R3, to line 51. R3 energizes upon the closure of contacts 65a to open its contacts R3A, and close its stick contacts R3B, the stick circuit extending back through tab contacts 36, contacts 150 opened by the carriage return key CR and now closed, contacts 136a to the line 50. It will be noted that the punch magnets 45, designated 0–9 have a common line connection 92 through contacts 122 now closed, and through normally closed relay contacts R3A to line 51, and the energization of relay R3 will prevent the energization of the above punch magnets as long as relay R3 is energized, and hence no manually controlled punching will occur while digit typing (such as 40 in designating the year, etc.) can nevertheless be effected under control of the auxiliary keyboard.

Following punching in column 29 of the tabulating card and while the operator is causing typing of the year to be effected by the keys of the auxiliary keyboard, certain duplicating operations are being effected in the punching machine from a master card upon the tabulating card in columns 29 to 43, inclusive, without attention of the operator. Such duplicating operations are well known in the form of punching machine shown and for further details reference may be had to the aforesaid Daly and Lee Patent 1,976,618. While such duplicating operations are being performed, the operator will manipulate the alphabetic keyboard of the typewriter to type the heading on the invoice as designated by reference numeral 93 in Fig. 7. Thereafter, the operator uses the alphabetic keyboard of the typewriter to fill in the word "Same" after the designation "Ship to," and then the carriage return key CR of the auxiliary keyboard is operated to close its upper contacts and energize the CR solenoid 30 (Fig. 4a). As is well known in the form of typewriter shown, this will automatically return the typewriter carriage to a starting position and then a line spacing operation automatically follows. When the operator depresses the carriage return key CR of the auxiliary keyboard, it will open the lower contacts 150 and as shown in Fig. 4b will break the stick circuit for the relay R3 and the latter relay now deenergizes. The punch is now connected for punching operations under control of the auxiliary keyboard.

By keeping the carriage return key CR depressed, subsequent repeated line spaces will bring the invoice to a position where the first line of the product sold and related data is to be typed. The punch and typewriter are again interconnected for common control by the auxiliary keyboard.

The final column for automatic duplicating operations consists of column 43 and at this column position of the punch card carriage, the zero elimination relay R2 is again set up by a plug connection 94. This plug connection is shown in Fig. 9 and extends from the plug socket 75 for column 43 to one of the series of the plug sockets 143 which are connected by jumper 145 to the zero elimination plug sockets 83.

It occasionally happens that all of the plug sockets for the functions are used up, and in this case additional capacity is effected by a jumper 145 (Fig. 9) to a series of "Single operations" plug sockets 143 (Fig. 6). When the punching of column 47 is effected, by means of a plug connection 95 another of the multiple operation relays of the R10 type is energized which closes its contacts so as to concomitantly perform two functions, namely, the tabulation of the typewriter carriage and also the setup of the zero elimination device. The plug connection 146 effects the automatic tabulation of the typewriter carriage while the plug connection 147 effects the setup of the zero elimination relay R2. There is, therefore, an automatic tabulation of the carriage in the customary manner to the "Product" field for typing and the zero elimination device is effective in punching the amount of the product. The product amount is punched in columns 48 to 52, the first two digits referring to the group or classification of the product, and the next three digits referring to the number of the item. When column 52 is punched, the card carriage is at such position and by means of a plug connection 199, another multiple operation relay of the R10 type is energized which closes its contacts and by means of appropriate plug connections will effect three different functions, namely, the setup of the zero elimination device or relay R2, the tabulation of the typewriter carriage and also the setting up of relay R3 which will cause punching operations to be stopped or, in other words, cutout during subsequent typing operations. The plug connection 97 causes the setup of the zero elimination device; the plug connection 98 causes the energization of the tabulating control solenoid 30 and the plug connection 99 to one of the "Stop punching" plug sockets will effect the energization of the relay R3 and in the manner which will subsequently be described prevent punching operations while typing is being effected.

After the tabulation of the typewriter carriage, the alphabet keyboard of the typewriter is employed to type upon the invoice the description of the first article or goods sold, such as "Sweet potatoes," the punch card carriage remaining at column 53 to which it was spaced after column 52 was punched. The cutout of the punching operations is effected when column 52 of the card is perforated, enabling the closure of a circuit through the plug connection 199 from column 52 to the relay R3 (Fig. 4b). The latter energizes to open its contacts R3A and as previously stated disconnects the punch magnets 45 from the line 51 so that when the keys of the auxiliary keyboard are successively operated to punch the "Unit price" —210— on the invoice, there will be no punching of this number upon the tabulating card, the card carriage of the punch remaining at column 53. When the units digit of this number is typed which happens to be "zero" in the example selected, a tab stop 32 at this column position of the typewriter carriage will open contacts 36 (Fig. 4b), thereby breaking the stick circuit for the relay R3, deenergizing relay R3 so that its contacts R3A may again close to reconnect the punch magnets 45 with the auxiliary contacts.

It will be recalled that relay R2 is set up for zero elimination when column 52 is punched and also at this column position relay R3 is energized to cutout punching while typing "Sweet potatoes" and the unit price —210—. The zero elimination relay R2 is set up for later use in punching and typing the amount in columns 53—58 for the sales amount and to prevent breaking down the zero elimination relay setup effected upon opening the contacts 42 by the operation of the first typewriter key lever in typing the digit "2" contacts R3C are provided. These shunt contacts 42 and 42A until relay R3 is deenergized which is effected after typing the "0" in the units price amount —210—. Hence the zero elimination relay R2 will remain energized irrespective of opening any of the contacts 42 or 42A.

Next, the sales amount —147.00— is typed on the invoice and the same digits are concurrently punched on the card in columns 53 to 58 and six columns of punching and typing have been allocated for such designations. It is evident that since a monetary amount is typed upon a bill that such typing should be made in the conventional manner, that is, with regard to the decimal point and the comma for separating the thousand of dollars digit. In the present machine, automatic typing operations are effected for both the comma and the period to take care of this requirement. The first digit punched and typed is the digit of the thousands of dollars column and is punched in column 53 of the tabulating card and after punching this digit, a circuit is closed from the socket 75 for the fifty-third column by a plug connection 100 (Fig. 9) to one of the plug sockets to which the solenoid 30 for causing automatic operation of the key for printing the comma is connected, as is shown in Fig. 4a. The automatic energization of the solenoid will then cause the printing of the comma after the digits for the thousands of dollars has been typed. This does not occur in the amount printed —147.00— for the line of typing now being considered but it does occur for the amount directly below, namely, —2,269.67— in which it will be noted that there is an automatic typing of the comma.

In printing the number —147.00— it will be recalled that the zero elimination relay R2 has been energized and its contacts 2RB (Fig. 4b) and R2C (Fig. 4a) are transferred. With the carriage at column 53, the thousands dollar digit is zero and when the zero key of the auxiliary keyboard is depressed to punch the required zero, a circuit is closed from the "0" contacts 41, line 84, R2B contacts transferred, line 85 to the space solenoid 30. When the "0" digit is punched, contacts 65a (Fig. 4b) close, sending an impulse by the plug connection 100 but since contacts R2C are transferred, the impulse is sent to the space solenoid 30 thus again spacing the typewriter. The "1" key is then depressed which will punch and type this digit. However, in printing a digit 1–9 in the thousands dollar order such as 2 in the amount —2,269.67—, the "2" contact 42 (Fig. 4b) will open the stick circuit to relay R2 and contacts R2B and R2C transfer to normal. In this case the impulse sent through by plug connection 100 after typing "2" is transmitted to the "comma" solenoid 30, thus printing this punctuation mark.

The automatic printing of the period or decimal point between the dimes and dollars digits is effected by a plug connection 101 which extends from the plug socket 75 for the fifty-sixth column to the plug socket to which the solenoid 30 for causing the automatic operation of the typewriter key for printing the period. Thus, after punching and typing the digit in the dollars position to the left of the decimal point, the period will be automatically typed for printing the decimal point.

The zero elimination device is also set up for the amount field but it is desirable that the zero to the left of the units of the cents or in the dimes column be automatically typed when no dollars are typed which is very desirable in representing cents of money. Otherwise, if the automatic zero elimination device was effective for all orders if nine cents was printed, it would be typed . 9 but rendering the zero elimination device ineffective after printing the period will enable the typing of the zero so that the aforesaid amount will be printed .09. When the period typewriter key is coupled to the roller, the lever 13 of this key will open its contacts 42A (see Fig. 2) thus breaking the stick circuit for the zero elimination setup relay R2 (see Fig. 4b) so that even if the next digit was zero in the dimes column, instead of eliminating the printing of the zero it will be typed.

When column 58 is punched and after the punching and typing of this digit, a circuit is closed from the plug socket 75 for the fifty-eighth column to another of the multiple operations relay of the R10 type, this circuit being closed by means of a plug connection 102. This relay now being energized will close its contacts to perform concomitantly two functions, namely, the automatic return of the typewriter carriage with the concomitant line spacing operations and also to disconnect typing operations. The circuit for causing the automatic carriage return has been previously explained and in the present example is effected by the plug connection 103 (see Figs. 4a and 9). This will return the typewriter carriage to its left hand margin and also line space the invoice preparatory to typing upon the next line the data relating to the next article sold and identified upon the invoice.

However, further data is punched on the card without, however, typing this data on the invoice and consists of data which is punched in columns 59 to 64 and at the fifty-eighth card column position of the punch carriage by means of a plug connection 104 (Figs. 9 and 4b) a circuit is closed to the relay R1 which closes its stick contacts R1B and opens its multicontacts R1A, (Fig. 4a); thus disconnecting the solenoids whose circuit connections extend through these multicontacts, thereby disconnecting such solenoids from control by the keys of the auxiliary keyboard. Thus, printing of the digits 0 to 9 cannot be effected on the invoice while punching of the tabulating card is being effected as long as relay R1 is held energized. The stick circuit for the aforesaid relay R1 extends through stick contacts R1B, the tab control contacts 35, relay contacts 4A now closed, contacts 150 opened by the carriage return key CR, through contacts 136a, and back to the line 50. The cost of the goods is punched in columns 59 to 64 inclusive and at column 64 a circuit connection is made by a plug connection 105 (Fig. 9) to energize the carriage return solenoid CR. Since the carriage of the typewriter is already at its left hand margin position, having been previously returned, only a line spacing operation will now be effected and with the previous line spacing operation a double line space will now have been made.

If the field after column 64 was to be both typed and punched, a plug connection 107 would be made for column 64 which, as shown in Fig. 4b, will energize relay R4 to open contacts R4A to deenergize relay R1. Contacts 35 can also be used to deenergize R1 to resume typing, by movement of the typewriter carriage, such as tabulating or spacing, to a position where contacts 35 would be opened.

After column 64 has been punched as indicated in Fig. 8, the punch card carriage skips to the last column position and as is well known causes ejection of the previously punched card, feeding a new card to the bed plate of the card carriage, and returning the card carriage to initial position, after which it skips to the desired starting column, or column 21 in this case. The opening of contacts 136a during this operation deenergizes relay R1. With a blank card now in the carriage of the punch, a second tabulating card is punched to represent the second line of data relating to the next article sold and which is typed upon the invoice. The above typing and punching operations are repeated until all the data has been recorded by typing on the invoice and punching separate tabulating cards. Upon completing the typing of one invoice, the latter is removed from the typewriter carriage and a new blank invoice inserted therein preparatory to recording the data for the next bill.

*Margin control circuit*

In order that any of the controls hereinbefore mentioned may be operative at the initial starting position of the punch carriage and typewriter carriage, contacts 109 (Fig. 4b) are provided on the punch. At the starting column of the punch these contacts are closed. As more fully shown and described in the patent to F. L. Lee, et al. 1,772,186, the punching machine shown herein is provided with a bar 195 (Fig. 4b) secured to the card carriage and having at column intervals openings 196 into which may be inserted the shank of a set screw 197 threaded in a block 198 adjustable on bar 195. At the initial starting position, a cam projection on block 198 will close contacts 109. The elements 195, 196, 197, 198 are similarly designated in the last mentioned patents. At the initial position of the typewriter carriage the tab contacts 37 will be closed and in conjunction with contacts 109 will energize a relay R5 and the latter will close its multicontacts R5A. The relay contacts R5A extend to plug sockets 106 also shown in Fig. 6. If from these sockets plug connections are made to the sockets which are connected to relays R1, R2, R3, R4, or some of the solenoids 30 for effecting desired operations in the typewriter these functions may be performed in accordance with the requirements at the initial position of both carriages. For example, a plug connection to energize relay R1 will suppress typing while punching takes place; to energize relay R2 for zero typing elimination; to energize relay R3 will stop punching while typing takes place; to solenoid 30 for the period will print a period at the start of typing; and variously different controls may be selected for operation at the will of the operator. When the punch carriage spaces from its initial starting position, contacts 109 open which break the circuit for relay R5, the same being true for the typewriter carriage when it opens contacts 37.

In the particular example described, use is also made of the margin control circuit for effecting zero typing elimination for the first card field. With reference, particularly to Figs. 4b and 6, it will be noted that a plug connection 82 hereinbefore referred to is made from one of the plug sockets 106 to one of the "Zero elimination" plug sockets 83. The punch card carriage, as previously described, is skipped to the column 21 position and with the block 198 adjusted so that contacts 109 are closed at column 21, and with tab stop 37 closed at the margin position of the typewriter carriage, it will be noted that relay R5 is energized to close the contacts R5A, thereby closing a circuit from the line 50 through relay contacts R5A, plug socket 106 to which the plug connection 82 is made, thence to one of the plug sockets 83 which is connected to the relay R2. The circuit then extends from the other side of relay R2 through relay contacts R3A now closed, to the line 51. Therefore, at the initial starting position of the punch card carriage and the typewriter carriage, the zero elimination device will be set up for the first card field which, it will be recalled, is the field for designating the invoice number, both upon the invoice and the card in columns 21 to 25, inclusive.

Carriage return interlock

The purpose of this arrangement is to prevent erroneous operations which might be effected by the return movement of the typewriter carriage, such as the opening or closing of the tab stop contacts 35, 36, 37, 38 which might erroneously energize the control relays or solenoids and thus cause improper operations. Thus, preselected controls will not function during the carriage return.

In Fig. 4b, 110 designates contacts which are similar to contacts 42A in Fig. 4 except that they are closed upon the operation of the carriage return key CR, when the related solenoid 30 is energized. This is effected by having the upper blade of the contacts extend to be operated by lever 13 and have the contacts normally opened. Thus, lever 13 will close contacts 110 and energizes a relay R6 which will close its stick contacts R6A which extends back to line 50 through tab contacts 34. Relay R6 will close contacts R6B, R6C, R6D, R6E which shunt contacts 37, 35, 36, 38 respectively, and thus opening or closing of these contacts will be ineffective during the return movement of the typewriter carriage. When the latter is at its starting position tab contacts 34 will be opened to break the stick circuit of relay R6.

Typewriter keyboard

There has been a previous reference to the use of the alphabet typewriter keyboard for typing data on the invoice such as is designated by reference 93 in Fig. 7. Further use of the alphabet keyboard was made for typing in the description of the articles sold. In neither of such instances was there any necessity for representing this alphabetic data on the punched card, but it may be desirable in some instances to represent the same data by punchings on the tabulating card. The manner in which this may be done and the selective controls utilized in connection therewith, will now be described in detail.

In Fig. 4a, reference numeral 115 represents a series of contacts which are similar to the contacts 42A shown in Fig. 2. However, such contacts are closed upon the actuation of the alphabet keys A to Z and these contacts are closed in combination so as to energize the punch magnets 45 in corresponding combinations. As is well known, alphabetic data is represented in the columns of the card by combinations of perforations and it is for this reason that the alphabet keys cause the closure of one or more contacts, depending upon the particular designation. This mode of operation is well known and the preferred code is as follows:

| Letter | Punch magnets energized | Letter | Punch magnets energized | Letter | Punch magnets energized |
|---|---|---|---|---|---|
| A | R and 1 | | | | |
| B | R and 2 | J | X and 1 | | |
| C | R and 3 | K | X and 2 | S | O and 2 |
| D | R and 4 | L | X and 3 | T | O and 3 |
| E | R and 5 | M | X and 4 | U | O and 4 |
| F | R and 6 | N | X and 5 | V | O and 5 |
| G | R and 7 | O | X and 6 | W | O and 6 |
| H | R and 8 | P | X and 7 | X | O and 7 |
| I | R and 9 | Q | X and 8 | Y | O and 8 |
| | | R | X and 9 | Z | O and 9 |

The alphabetic data which is to be typed may consist of different data, some of which is to be perforated and some of which is to be typed and to enable the selective control for punching it will be noted that in Fig. 6 there is provided on the plugboard a series of "Start punching" sockets 116 and such sockets, as shown in Fig. 4b, are connected to the relay R7. When the card carriage of the punch is at a predetermined column position and it is desired at this time to both punch and type the alphabetic data, a plug connection is made from such column position to one of the sockets 116, this plug connection being identified by reference numeral 117 in Fig. 4b. At such column position, the relay R7 will be energized to cause the closure of its stick contacts R7B and also the closure of contacts R7A. It will be noted that there is a common line connection 118 for the series of contacts 115, and the circuit extends through contacts 119 which are normally closed, and thence through contacts R7A back to the line 50. Relay contacts R7A are normally opened so that when it is desired to effect punching of alphabetic data, the energization of the relay R7 will set up this control for subsequent alphabetic punching. When the field of alphabetic punching has been completed, the tab stop 38 will be opened, thereby opening the stick circuit of the relay R7 through contacts R7B, enabling the opening of contacts R7A and rendering the contacts 115 ineffective to energize the punch magnets 45. Subsequent operations of the alphabetic keyboard of the typewriter will cause the typing of data without, however, effecting the punching of the data on the tabulating card.

Punch-type switch and controls operated thereby

The machine as hereinbefore described was normally interconnected so that there would be a concomitant operation of the punching machine and the typewriter but it is further desirable that the typewriter or punch be rendered independently operable and effective for use without the concomitant operation of the other. Further selective controls are in the nature of a three-position switch 120 shown in Fig. 4b. In the "2" position shown, —Punch-typewriter interconnected— there is a normal interconnection of the punching machine and the typewriter but when the switch is moved so that it is in the "3" position, contacts 121 will be closed and contacts 125 and 140 opened.

This will complete a circuit from the line 50 through the contacts 121 to the relay R1 to the line 51. The energization of the relay R1 will retain the contacts R1A opened as long as the switch 120 is in the "punch only" position. The opening of the contacts R1A will, as has been previously described, disconnect the related typewriter solenoids 30 0-9 and the "Space" solenoid from the auxiliary keyboard. The opening of contacts 125 will disconnect the "TAB, CR, Space, Period, Comma, Dash, Diagonal," solenoids 30 to also prevent their energization in any possible manner. The connection between the auxiliary keyboard and the punch magnets 45 will, however, be retained. This will enable the operator to use the auxiliary keyboard to punch data on the card without, however, typing the same upon the invoice or effecting the operation of the typewriter keys. The opening of contacts 140 prevent energization of relays or magnets which might be energized as the punch carriage steps along which might be possible due to the plugboard connections already made.

The use of the alphabet typewriter keys with the switch 120 in the "3" position will enable both punching and typing of the alphabetic data. The energization of the relay R1 will cause the closure of contacts R1C, and the common line of the contacts 115 will be connected by the line 118 through contacts 119 which are closed when the switch 120 is in the "3" position, thence through contacts R1C to the line 50.

When the switch 120 is in the "type only" or "1" position, the punch magnets 45 are disconnected both from the auxiliary keyboard and the alphabetic keyboard. When the switch 120 is in this position, it will open contacts 119, breaking the circuit of the common line for the contacts 115 and this circuit will be broken irrespective of whether relay R1 has been, in any manner, previously energized. When the switch 120 is in the "type only" position, it will open contacts 122 which disconnect the line 51 from the punch magnets 45. Hence, the contacts 41 closed by the keys of the auxiliary keyboard will be ineffective to energize the punch magnets 45 but they will, however, energize the solenoids 30 for the typewriter. This will enable the typing of the digits by the auxiliary keyboard without punching the data upon a card.

The last mentioned controls add to the already described selective controls for the typewriter and punching machine and enable selective typing and punching in various manners, thereby taking care of most, if not all of the commercial requirements for machines of this type. The various controls may be exercised by the operator in accordance with the different requirements, effected either by plug connections which are accessible to the operator or by the manipulation of the switch 120.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a recording arrangement of the class described, the combination of a typewriter which includes a carriage and digit typing instrumentalities for one form of recording, a punching machine including a carriage and digit punch selectors for another form of recording, means comprising an auxiliary keyboard apart from the keyboard of either the typewriter or punching machine to effect concomitant operation of said digit typing instrumentalities and said punch selectors, and means comprising selective connections set up prior to recording to separate typewriter and punching machine controlling instrumentalities to prevent the operation of the digit typing instrumentalities or the punch selectors and so arranged that under control of both of said carriages said separate controlling instrumentalities may be automatically effective or ineffective by said connections whereby at the will of the operator either form of recording may ensue while the other form of recording is prevented, or both forms of recording may ensue concurrently.

2. In a recording arrangement of the class described, the combination of a typewriter which includes a carriage and both alphabet and digit typing instrumentalities for one form of recording, a punching machine including a carriage and punch selectors for punch recording representing either alphabetical or numerical data comprising another form of recording, means comprising an auxiliary keyboard apart from the keyboard of either the typewriter or punching machine to effect concomitant operation of the typing instrumentalities and the punch selectors for recording either alphabetical or numerical data, and means comprising selective connections set up prior to recording to a plurality of typewriter and punching machine controlling instrumentalities and set in operation under control of both carriages to automatically prevent either form of recording while the other form of recording ensues, either when numerical data is recorded, or alphabetical data is recorded, or to automatically effect concurrent alphabetical or numerical recording of both forms.

3. In a recording arrangement of the class described, the combination of a typewriter which includes power driven typing instrumentalities for one form of recording and includes the usual platen carriage, a punching machine including punch selectors and a carriage movable step by step as the punch selectors are operated, means comprising an auxiliary keyboard apart from the keyboard of either the typewriter or punching machine to effect concomitant operation of the power driven typing instrumentalities and said punch selectors, and means comprising selective connections set up prior to recording for rendering effective or ineffective under control of both of said carriages separate controlling instrumentalities for enabling by said connections one form of recording while preventing another form of recording as different data is recorded, or causing recording of both forms concurrently for other data.

4. In a recording arrangement of the class described, the combination of a typewriter which includes power driven typing instrumentalities for one form of recording, character printing instrumentalities, and the usual platen carriage, a punching machine including punching selectors for another form of recording and a carriage movable step by step as the punch selectors are operated, means comprising a keyboard to effect concomitant operation of the power driven typing instrumentalities and said punch selectors, and a plugboard comprising selective connections operable jointly with said carriages for rendering effective or ineffective separate typewriter and punching machine controlling instrumentalities for preventing either form of recording operation while the other form of recording operation is effective under control of said keyboard, said plugboard also including selective connections to the power driven character printing instrumentalities operable under control of the punching machine carriage to render the latter selectively effective at predetermined positions of the punching machine carriage.

5. In a recording arrangement of the class described, the combination of a typewriter which includes; power driven typing and character printing instrumentalities for one form of recording; the usual platen carriage, and power driven instrumentalities for functional operations in the typewriter such as tabulate, carriage return, etc., a punching machine including punch selectors for another form of recording and a carriage movable step by step, and a plugboard comprising selective connections operable jointly with said carriages for rendering effective or ineffective typewriter and punching machine controlling instrumentalities for preventing either form of recording while the other form is effective under control of the keyboard, said plugboard also including selective connections to the power driven character typing and power driven instrumentalities for functional operations and operable under control of said punching machine carriage for initiating their operations at predetermined positions of the punching machine carriage.

6. In interconnected typewriter and punching machines, the combination of power driven digit typing instrumentalities of the typewriter and digit punch selectors of the punching machine, an auxiliary keyboard apart from any keyboard of either machine, and controlling means for the power driven digit typing instrumentalities and the digit punch selectors commonly controlled by said keyboard to effect concurrent operation of the digit punch selectors and said power driven digit typing instrumentalities.

7. In interconnected typewriter and punching machines, the combination of power driven digit typing instrumentalities of the typewriter and digit punch selectors of the punching machine to effect punching as the selectors are operated, an auxiliary keyboard apart from any keyboard of either machine, and controlling means for the power driven digit typing instrumentalities and the digit punch selectors commonly controlled by said keyboard to effect concurrent operation of the digit punch selectors and said power driven digit typing instrumentalities to punch digits as said digits are typed.

8. In a recording system of the class described, the combination of a punching machine which includes a reciprocable carriage returnable at the completion of punching operations to a margin position, a typewriter including the usual platen carriage returnable to a margin position at the completion of typing, selected instrumentalities for effecting useful functions in either the typewriter or punching machine, and means controlled by both carriages and operable when both are in their margin positions for effecting the operation of the selected instrumentality.

9. In a recording system of the class described, the combination with a typewriter which includes power driven typing instrumentalities, of a punching machine including punch selectors operable concurrently with said typing instrumentalities, and including a carriage movable step by step as the punch selectors are successively operated, a plurality of controlling instrumentalities for effecting useful functions with respect to the typewriter or the punching machine, and means controlled by said carriage for effecting the operation of selected controlling instrumentalities, said means enabling the selection of a plurality of instrumentalities and their concurrent operation at a predetermined position of the carriage.

10. In interconnected typewriter and punching machines, the combination of power driven digit typing instrumentalities of the typewriter and digit punching selectors of the punching machine, said punching machine including a carriage movable step by step, means to concomitantly effect the operation of said punch selectors and said digit typing instrumentalities, selective means for preventing said digit typing instrumentalities from being operated at certain predetermined positions of said carriage, and other selective means for again causing said printing instrumentalities to be operated and at other predetermined positions of said carriage.

11. In interconnected typewriter and punching machines, the combination of power driven digit typing instrumentalities of the typewriter and digit punching selectors of the punching machine, said punching machine including a carriage movable step by step, means to concomitantly effect the operation of said punch selectors and said digit typing instrumentalities, and means controlled by said carriage for repeatedly disconnecting and connecting said digit typing instrumentalities from said keyboard at certain predetermined positions of said carriage to enable upon a disconnection the sole operation of said punch selectors without the operation of said digit typing instrumentalities until said connection is effected.

12. In interconnected typewriter and punching machines, the combination of power driven digit typing instrumentalities of the typewriter and digit punch selectors of the punching machine, said punching machine including a carriage movable step by step, an auxiliary keyboard apart from any keyboard of either machine controlling means to effect concomitant operation of said digit typing instrumentalities and said punch selectors, and means controlled by said punch carriage to render said controlling means for the digit typing instrumentalities ineffective to prevent digit typing operations while enabling operation of the digit punching selectors, said last named means being subsequently rendered ineffective by said punch carriage upon the latter occupying a predetermined column position.

13. In a recording arrangement of the class described, the combination of a typewriter which includes alphabetical typing instrumentalities for one form of recording, a punching machine provided with punch selectors settable in combinations to punch alphabetical data for another form of recording, means to effect concomitant operation of said alphabetical typing instrumentalities and said punch selectors, and means comprising selective connections to separate controlling instrumentalities to prevent the operation of the punch selectors whereby at the will of the operator alphabetical typing recording may ensue while punching recording is prevented.

14. In an interconnected typewriter and punching machine, the combination of power driven alphabetic typing instrumentalities of the typewriter and punch selectors of the punching machine settable in combination for alphabetic punch recording, said punching machine including a carriage movable step by step and said typewriter including the usual platen carriage, means comprising the alphabetic keyboard of the typewriter to effect concomitant operation of said alphabetic typing instrumentalities and said punch selectors, means controlled by said punch carriage to suppress the operation of said punch selectors while the alphabetical typing instrumentalities are effective to cause alphabetic typing operations under control of the alphabetic keyboard, and means comprising selectively adjustable devices mounted on the typewriter carriage for causing the suppressing means to be ineffective upon the typewriter carriage occupying a predetermined column position.

15. In an interconnected typewriter and punching machine, the combination of typing instrumentalities of the typewriter which includes the usual platen carriage and punch selectors of the punching machine which is provided with a carriage movable step by step, a common keyboard for concomitantly effecting the operation of said typing instrumentalities and said punch selectors, and inter-controlling means between said typewriter and said punching machine comprising means under control of said punching machine carriage for repeatedly disconnecting the punch selectors from said keyboard to prevent operation of the punch selectors while enabling the operation of the typing instrumentalities, and under control of the typewriter carriage to again connect the punch selectors to said keyboard after each disconnection, and means controlled solely by the punching machine carriage for repeatedly connecting and disconnecting the typing instrumentalities from said keyboard.

16. In an interconnected typewriter and punching machine, the combination of digit typing instrumentalities of the typewriter which includes the usual platen carriage, digit punch selectors of the punching machine which includes a carriage movable step by step, a common keyboard for concomitantly effecting the operation of said digit typing instrumentalities and said punch selectors, and intercontrolling means between said typewriter and said punching machine comprising means for selectively preventing under control of the punching machine carriage the operation of the punch selectors while enabling the operation of the digit typing instrumentalities and thereafter initiating punch selector operations at a predetermined position of the typewriter carriage, and means under control of said punching machine carriage for selectively preventing the operation of the digit typing instrumentalities while enabling the operation of said punch selectors and thereafter under control of and at a predetermined position of the punching machine carriage cause the operation of the digit typing instrumentalities as the punch selectors are operated.

17. In a recording system of the class described, the combination of a punching machine which includes a reciprocable carriage returned at the completion of punching operations to a margin position, a typewriter including typing instrumentalities operable concomitantly with punching operations and a platen carriage returned at the completion of typing to a margin position, a plurality of selected instrumentalities for preventing typing operations while punching operations ensue, and conversely preventing punching operations while typing ensues, and means controlled by both carriages and operable when both are at their margin positions for effecting the operation of the selected instrumentality.

18. In a recording system of the class described, the combination with a typewriter which includes numerical data printing instrumentalities, of a punching machine including punch selectors, means comprising an auxiliary keyboard to effect the concomitant operation of the punch selectors and the numerical data printing instrumentalities, and selective means having three different positions of adjustment, in one position causing the operation of means to prevent the operation of the punch selectors while enabling the operation of the numerical data printing instrumentalities by the auxiliary keyboard to type only, in the second position enabling the auxiliary keyboard to effect the concomitant operation of the punch selectors and the numerical data printing instrumentalities, and in the third position causing the operation of means to prevent the operation of the numerical data printing instrumentalities while enabling the operation of the punch selectors under control of the auxiliary keyboard.

19. In a recording system of the class described, the combination with a typewriter which includes alphabetical data printing instrumentalities operable by the corresponding alphabetic keyboard, of a punching machine including punch selectors and a carriage moved step by step from which preselected controls may be exercised as the punch selectors are operated, means under control of the alphabetic keyboard for effecting the concomitant operation of the punch selectors and the alphabetical data printing instrumentalities, and selective means having three positions of adjustment in one position causing the operation of means to prevent the operation of the punch selectors while enabling the operation of the alphabetical data printing instrumentalities under control of the alphabetic keyboard, in position two, enabling the concurrent operation of the punch selectors and the alphabetical data printing instrumentalities under control of the alphabetic keyboard and in the third position, enabling the concomitant operation of punch selectors and the alphabetical data printing instrumentalities under control of the alphabetic keyboard but causing the operation of means to prevent the punch carriage from exercising its controls as it is stepped along by the concurrent operation of the punch selectors and the alphabetic typing instrumentalities under control of the alphabetic keyboard.

20. In an interconnected typewriter and punching machine which includes in the typewriter digit typing instrumentalities and in the punching machine digit punching instrumentalities, the combination of keys for controlling said instrumentalities for concomitant typing and punching recording, said keys including a 0 digit key and digit keys 1-9, means to suppress the operation of the zero typing instrumentality upon operation of the 0 digit key as the digits of the higher orders are punched, and means controlled by the digit keys 1-9 for rendering said suppressing means inoperable, thereby enabling concomitant digit typing and punching of digits 0-9 for lower orders of the amount recorded.

21. In an interconnected typewriter and punching machine which includes in the typewriter 0-9 digit typing instrumentalities, a period printing instrumentality and in the punching machine digit punching instrumentalities, the combination of keys for controlling said digit typing and punching instrumentalities for concomitant typing and punching digit recording, said keys including a 0 digit key and digit keys 1-9, automatically operated means to cause operation of the period printing instrumentality, means to suppress the operation of the zero typing instrumentality upon operation of the 0 digit key as the digits of the higher orders are punched, and means controlled by the digit keys 1–9 and said automatically operated means for rendering said suppressing means inoperable, thereby enabling concomitant digit typing and punching of digits 0–9 for lower orders of the amount recorded.

22. In an interconnected typewriter and punching machine which includes in the typewriter separate power driven 0–9 digit typing instrumentalities, a power driven period printing instrumentality, and in the punching machine digit punching instrumentalities, the combination of keys for controlling said digit printing and punching instrumentalities for concomitant digit typing and punching recording, said keys including a 0 digit key and digit keys 1–9, automatic means to effect the operation of the power driven period printing instrumentality, means to suppress the operation of the zero typing instrumentality upon operation of the 0 digit key as the digits of the higher orders are punched, and means controlled by the power driven 1–9 digit typing instrumentalities and said period printing instrumentality for rendering said suppressing means inoperable, thereby enabling subsequent concomitant digit typing and punching of digits 0–9 for lower orders of the amount recorded.

23. In an interconnected typewriter and punching machine which includes in the typewriter digit typing instrumentalities and in the punching machine digit punching instrumentalities and a step by step movable carriage, the combination of keys for controlling said instrumentalities for concomitant digit typing and punching recording, said keys including a 0 digit key and digit keys 1–9, means to suppress the operation of the zero typing instrumentality upon operation of the 0 digit key as the digits of the higher orders are punched, means controlled by the digit keys 1–9 for rendering said suppressing means inoperable, thereby enabling concomitant digit typing and punching of digits 0–9 for lower orders of the amount recorded, and means controlled by said carriage for rendering said suppressing means effective at certain card carriage positions including selective connections to said suppressing means effective at predetermined positions of said carriage.

24. In an interconnected typewriter and punching machine which includes in the typewriter digit typing instrumentalities a typewriter carriage and in the punching machine digit punching instrumentalities and a punch carriage, the combination of keys for controlling said instrumentalities for concomitant typing and punching recording, said keys including a 0 digit key and digit keys 1–9, means to suppress the operation of the zero typing instrumentality upon operation of the 0 digit key as the digits of the higher orders are punched, means controlled by the digit keys 1–9 for rendering said suppressing means inoperable, thereby enabling concomitant digit typing and punching of digits 0–9 for lower orders of the amount recorded, and means controlled by both of the aforesaid carriages for rendering said suppressing means effective when both are at their margin positions.

25. In an interconnected typewriter and punching machine which includes in the typewriter the usual platen carriage and typewriter digit typing instrumentalities, and in the punching machine diigt punching selectors, and a carriage movable step by step as the punch selectors are operated, both of the aforesaid carriages being returned to a margin position upon the completion of recording operations, the combination of elements for controlling the typewriter digit typing instrumentalities for typing of the digits concomitantly with the operaion of said selectors, said controlling elements including a 0 digit element and elements 1–9, means set up to suppress the operation of the 0 typing instrumentality upon operation of the 0 element as the 0 punch selector for higher orders is operated, means controlled by the elements 1–9 for rendering said suppressing means inoperable, thereby enabling concomitant digit typing for digits 0–9 and setting of the punch selectors 0–9 for lower orders of the amount to be recorded, and means controlled by both of the aforesaid carriages and effective when both of the carriages are at their margin positions for causing the setup of the aforesaid suppressing means.

26. In an interconnected typewriter and punching machine which includes in the typewriter digit typing instrumentalities, and in the punching machine digit punching selectors, the combination of elements for controlling typing of the digits concomitantly with the operation of said selectors, said controlling elements including a 0 digit element and elements 1–9, means to suppress the operation of the 0 typing instrumentality upon operation of the 0 element as the 0 punch selector for higher orders is operated, and means controlled by the elements 1–9 for rendering said suppressing means inoperable, thereby enabling concomitant digit typing for digits 0–9 and setting of the punch selectors 0–9 for lower orders of the amount to be recorded.

27. In an interconnected typewriter and punching machine which includes in the typewriter digit typing instrumentalities, a punctuation printing instrumentality and in the punching machine digit punching selectors, the combination of elements for controlling typing of the digits concomitant with the operation of said selectors, said controlling elements including a 0 digit element and elements 1–9, means to suppress the operation of the 0 typing instrumentality upon operation of the 0 element as the 0 punch selectors for higher orders are operated, and means controlled by the elements 0–9 and said punctuation printing instrumentality for rendering said suppressing means inoperable, thereby enabling concomitant digit typing for digits 0–9 and setting of the punch selectors 0–9 for lower orders of the amount to be recorded.

28. In an interconnected typewriter and punching machine which includes in the typewriter digit typing instrumentalities, a punctuation printing instrumentality, and in the punching machine digit punching selectors, and a step by step movable carriage, the combination of elements for controlling typing of the digits concomitant with the operation of said selectors, said controlling elements including a 0 digit element and elements 1–9, means to suppress the operation of the 0 typing instrumentality upon operation of the 0 element as the 0 punch selectors for higher orders are operated, means controlled by the elements 1–9 for rendering said suppressing means inoperable, thereby enabling concomitant digit typing for digits 0–9 and setting of the punch selectors 0–9 for lower orders of the amount to be recorded, means set in operation by said carriage at a predetermined position thereof for effecting the automatic operation of the punctuation printing instrumentality and for effecting the operation of said suppressing means.

29. In an interconnected typewriter and punching machine which includes in the typewriter digit typing instrumentalities and in the punching machine digit punching selectors and a step by step movable carriage, the combination of elements for controlling typing of the digits concomitant with the operation of said selectors, said controlling elements including a 0 digit element and elements 1-9, means to suppress the operation of the 0 typing instrumentality upon operation of the 0 element as the 0 punch selectors for higher orders are operated, means controlled by the elements 1-9 for rendering said suppressing means inoperable, thereby enabling concomitant digit typing for digits 0-9 and setting of the punch selectors 0-9 for lower orders of the amount to be recorded, and means controlled by said carriage to bring said suppressing means into operation at a predetermined carriage position.

30. In an interconnected typewriter and punching machine which includes in the typewriter digit typing instrumentalities, a period printing instrumentality, and in the punching machine digit punching selectors, and a step by step movable carriage, the combination of elements for controlling typing of the digits concomitant with the operation of said selectors, said controlling elements including a 0 digit element and elements 1-9, means to suppress the operation of the 0 typing instrumentality upon operation of the 0 element as the 0 punch selectors for higher orders are operated, means controlled by the elements 1-9 for rendering said suppressing means inoperable, thereby enabling concomitant digit typing for digits 0-9 and setting of the punch selectors 0-9 for lower orders of the amount to be recorded, means controlled by said carriage to bring said suppressing means into operation at a predetermined carriage position, and means controlled by said carriage to effect the automatic operation of said period printing instrumentality and to render said suppressing means inoperable in the event that said suppressing means has not been previously rendered inoperable by the elements 1-9.

31. In an interconnected typewriter and punching machine which includes in the typewriter 0-9 digit typing instrumentalities, a typewriter carriage space mechanism, and in the punching machine 0-9 digit punching selectors and a carriage movable step by step, the combination of elements for controlling typing of the digits concomitant with the operation of the selectors, said controlling elements including a 0 digit element and elements 1-9, means operative for higher 0 orders to suppress the operation of the 0 typing instrumentality and cause the operation of the typewriter carriage space mechanism instead as the 0 punch selectors are operated, means controlled by the elements 1-9 for rendering said suppressing means inoperable, thereby enabling concomitant digit typing for digits 0-9 and setting of the punch selectors 0-9 for lower orders of the amount to be recorded, and means controlled by said punch carriage at a predetermined position thereof for bringing said suppressing means into operation.

32. In an interconnected typewriter and punching machine which includes in the typewriter 0-9 digit typing instrumentalities, a period printing instrumentality, a typewriter carriage space mechanism, and in the punching machine 0-9 digit punching selectors, and a carriage movable step by step, the combination of elements for controlling typing of the digits concomitant with the operation of the selectors, said controlling elements including a 0 digit element and elements 1-9, means operative for higher 0 orders to suppress the operation of the 0 typing instrumentality and cause the operation of the typewriter carriage space mechanism instead as the 0 punch selectors are operated, means controlled by the elements 1-9 and said period printing instrumentality for rendering said suppressing means inoperable, thereby enabling concomitant digit typing for digits 0-9 and setting of the punch selectors 0-9 for lower orders of the amount to be recorded, and means controlled by said punch carriage for bringing said suppressing means into operation at a predetermined carriage position and said period printing instrumentality at another punch carriage position.

33. In an interconnected typewriter and punching machine which includes in the typewriter 0-9 digit typing instrumentalities, comma and period printing instrumentalities, a typewriter carriage space mechanism, and in the punching machine 0-9 digit punching selectors and a carriage movable step by step, the combination of elements for controlling typing of the digits concomitant with the operation of the selectors, said controlling elements including a 0 digit element and elements 1-9, means operative for higher 0 orders to suppress the operation of the 0 typing instrumentality and cause the operation of the typewriter carriage space mechanism instead as the 0 punch selectors are operated, and means controlled by the elements 1-9 and said period printing instrumentality for rendering said suppressing means inoperable, thereby enabling concomitant digit typing for digits 0-9 and setting of the punch selectors 0-9 for lower orders of the amount to be recorded, and means controlled by said punch carriage for bringing said suppressing means into operation at a predetermined position and said period printing and comma printing instrumentalities into operation automatically at other punch carriage positions.

34. In an interconnected typewriter and punching machine including in the typewriter 0-9 digit typing instrumentalities and a comma printing instrumentality for punctuation after the thousands of dollars position recording, said punching machine including 0-9 digit punching selectors, elements for concurrently controlling said punch selectors and said digit typing instrumentalities, and means for effecting the automatic operation of said comma printing instrumentality after the thousands of dollars digit type recording has been effected to thereby effect the customary punctuation in recording an amount.

35. In the combination of an interconnected typewriter and punching machine which including in the typewriter a comma typing instrumentality for higher order digit recording, a typewriter carriage space mechanism and 0-9 digit typing instrumentalities, and which includes in the punching machine 0-9 digit punching selectors, of elements for controlling the digit typing instrumentalities concomitant with the operation of the punch selectors, means to automatically effect the operation of the comma typing instrumentality after operation of digit typing instrumentality and related digit selector for recording the digit in the thousands of dollars position, means for suppressing the operation of the 0 typing instrumentality for orders to the left of the decimal point of the recorded amount, and concurrently therewith suppressing the operation of the comma period instrumentality but enabling the operation of said carriage space mechanism instead, and means operable upon recording a digit 1-9 for the thousands of dollars position for rendering said 0 and comma typing suppressing means inoperable and for causing the operation of the comma printing instrumentality to record the comma after the digit in the thousands of dollars position if said zero suppressing means is inoperable when the thousands of dollars digit is typed.

36. In the combination of an interconnected typewriter and punching machine which includes in the typewriter a comma typing instrumentality for higher order digit recording, 0-9 digit typing instrumentalities, and which includes in the punching machine 0-9 digit punching selectors, of elements for controlling the digit typing instrumentalities concomitant with the operation of the punch selectors, means to automatically effect the operation of the comma typing instrumentality after operation of digit typing instrumentality and related digit selector for recording the digit in the thousands of dollars position, means for suppressing the operation of the 0 typing instrumentality for higher orders to the left of the decimal point of the recorded amount, and means operable upon recording a digit 1-9 for such higher orders for rendering said 0 typing suppressing means inoperable and for causing the operation of the comma printing instrumentality to record the comma if said zero suppressing means is inoperable when the thousands of dollars digit is typed.

37. In the combination of an interconnected typewriter and punching machine which includes in the typewriter a period typing instrumentality for decimal point recording and 0-9 digit recording instrumentalities, and in the punching machine 0-9 digit punching selectors, elements for controlling the digit typing instrumentalities concomitant with the operation of the punch selectors, means for suppressing the operation of the 0 typing instrumentality for orders to the left of the decimal point, and means operable when said period typing instrumentality is operated for rendering said suppressing means inoperable after decimal point recording to enable the operation of the 0 typing instrumentality and the operation of the 0 punch selector in an order to the right of the decimal point.

38. In an interconnected typewriter and punching machine including in the typewriter 0-9 digit typing instrumentalities, a period printing instrumentality for decimal point recording, and a comma printing instrumentality for separation of a group of three digits to the left of the decimal point, said punching machine including 0-9 digit punching selectors, elements for controlling said punch selectors and said digit typing instrumentalities, and means for effecting the automatic operation of said comma printing instrumentality after the thousands of dollars digit has been recorded and the related digit punch selector has been operated and the automatic operation of the period printing instrumentality after the units dollars digit type recording has been effected and the related digit punch selector has been operated.

39. In an interconnected typewriter and punching machine including in the typewriter 0-9 digit typing instrumentalities and a period printing instrumentality for decimal point recording, said punching machine including 0-9 digit punching selectors, the combination of elements for controlling said punch selectors and said digit typing instrumentalities, and means for effecting the automatic operation of said period printing instrumentality after the units dollars digit type recording has been effected to thereby record the decimal point.

40. In an interconnected typewriter and punching machine including in the typewriter 0-9 digit typing instrumentalities and one or more character typing instrumentalities, said punching machine including 0-9 digit punching selectors and a carriage movable step by step as the selectors are set up, the combination of elements for concurrently controlling said punch selectors and said digit typing instrumentalities, and means controlled by said carriage for effecting the automatic operation of said character printing instrumentalities upon digit type recording being effected at predetermined positions of said carriage.

41. In an interconnected typewriter and punching machine including in the typewriter 0-9 digit typing instrumentalities and one or more selected character typing instrumentalities, said punching machine including 0-9 digit punching selectors and a carriage movable step by step as the selectors are set up, the combination of elements for concurrently controlling said punch selectors and said digit typing instrumentalities, means for effecting the automatic operation of said selected character printing instrumentalities upon digit type recording being effected, and selective means for effecting operations of selected character printing instrumentalities at predetermined positions of said carriage.

42. In an interconnected typewriter and punching machine including in the typewriter 0-9 digit typing instrumentalities and one or more character typing instrumentalities, and in said punching machine 0-9 digit punching selectors, a carriage movable step by step as the selectors are operated, and means for escaping said carriage step by step, the combination of means for concurrently causing the operation of said punch selectors and said digit typing instrumentalities, and means controlled by said carriage and rendered operable after the operation of the punching selectors and the digit typing instrumentalities and prior to escaping said carriage to the next column position for effecting the automatic operation of said character printing instrumentalities.

43. In an interconnected typewriter and punching machine including in the typewriter 0-9 digit typing instrumentalities and one or more functional instrumentalities, said punching machine including 0-9 digit punching selectors and a carriage movable step by step as the selectors are set up, the combination of elements for concurrently controlling said punch selectors and said digit typing instrumentalities, and means controlled by said carriage for effecting the automatic operation of said functional instrumentalities upon digit type recording being effected at predetermined positions of said carriage.

44. In an interconnected typewriter and punching machine including in the typewriter one or more functional instrumentalities, and 0-9 typing instrumentalities, the combination of 0-9 digit punching selectors, a carriage movable step by step as the elements are operated, means for escaping the carriage step by step as the selectors are operated, means for causing the concurrent operation of the punching selectors and said 0-9 typing instrumentalities, and means controlled by said carriage and rendered operable after the operation of the punching selectors and the digit typing instrumentalities and prior to escaping the carriage to the next column position for effecting the automatic operation of said functional instrumentalities.

45. In an interconnected typewriter and punching machine including in the typewriter a plurality of selectively operated functional instrumentalities and 0-9 typing instrumentalities the combination of 0-9 digit punching selectors, a carriage movable step by step as the selectors are operated, means for causing the concurrent operation of the punching selectors and said 0-9 typing instrumentalities, and means including selective connections to selected functional instrumentalities for causing their operation under control of said carriage and at predetermined positions thereof.

46. In a recording arrangement of the class described, the combination of a typewriter which includes digit typing instrumentalities for one form of recording, a punching machine including digit punch selectors for another form of recording, means comprising an auxiliary numerical keyboard in addition to the numerical keyboard of either the typewriter or punching machine to effect simultaneous operation of said digit typing instrumentalities and punch selectors, and a programming means automatically functioning during the operation of the auxiliary keyboard including selective connections, set up prior to recording, to separate typewriter and punching machine controlling instrumentalities to prevent or cause the operation of the digit typing instrumentalities or the punch selectors, said selective connections causing the separate controlling instrumentalities to be automatically effective or ineffective as the auxiliary keyboard is operated, whereby at the will of the operator digit typing may be prevented as the auxiliary keyboard is operated to effect punching, and punching may be prevented as the auxiliary keyboard is operated to effect digit typing.

CHARLES R. DOTY.